United States Patent

Teramoto et al.

(10) Patent No.: US 10,203,266 B2
(45) Date of Patent: Feb. 12, 2019

(54) BEARING TESTING MACHINE

(71) Applicant: KOKUSAI KEISOKUKI KABUSHIKI KAISHA, Tokyo (JP)

(72) Inventors: Takeshi Teramoto, Nara (JP); Sigeru Matsumoto, Tokyo (JP); Kazuhiro Murauchi, Tokyo (JP)

(73) Assignee: KOKUSAI KEISOKUKI KABUSHIKI KAISHA, Tokyo (JP)

( * ) Notice: Subject to any disclaimer, the term of this patent is extended or adjusted under 35 U.S.C. 154(b) by 215 days.

(21) Appl. No.: 15/179,013

(22) Filed: Jun. 10, 2016

(65) Prior Publication Data

US 2016/0282225 A1 Sep. 29, 2016

Related U.S. Application Data

(63) Continuation-in-part of application No. PCT/JP2014/082474, filed on Dec. 9, 2014.

(30) Foreign Application Priority Data

Dec. 12, 2013 (JP) .................................. 2013-257148

(51) Int. Cl.
G01M 7/02 (2006.01)
G01M 13/04 (2006.01)

(52) U.S. Cl.
CPC .......... G01M 13/045 (2013.01); G01M 7/027 (2013.01); G01M 13/04 (2013.01)

(58) Field of Classification Search
CPC ..... G01M 13/04; G01M 7/027; G01M 13/045
USPC .......................................................... 73/593
See application file for complete search history.

(56) References Cited

U.S. PATENT DOCUMENTS

| | | | | | |
|---|---|---|---|---|---|
| 3,152,468 | A | * | 10/1964 | Powell ................ | G01M 17/022 73/115.01 |
| 3,228,238 | A | * | 1/1966 | Jentet ...................... | G01N 3/34 73/577 |
| 5,503,479 | A | * | 4/1996 | Ide ......................... | F01D 25/166 384/122 |
| 2011/0179882 | A1 | * | 7/2011 | Koglin ................ | G01M 13/045 73/862.08 |

(Continued)

FOREIGN PATENT DOCUMENTS

| | | |
|---|---|---|
| CN | 103323247 A | 9/2013 |
| DE | 102008048131 | 4/2010 |

(Continued)

OTHER PUBLICATIONS

International Search Report issued in PCT/JP2014/082474 dated Mar. 17, 2015.

(Continued)

Primary Examiner — J M Saint Surin
(74) Attorney, Agent, or Firm — McCarter & English, LLP

(57) ABSTRACT

A bearing testing machine comprising: a testing machine shaft to which at least one test piece being a bearing is attached, the testing machine shaft being a rotation shaft extending in a Y axis direction being a horizontal direction; a rotational driving unit configured to rotate the testing machine shaft; a test piece holding unit configured to elastically holds the test piece; and an at least one axle driving unit configured to drive the testing machine shaft in a vertical direction and in an X axis direction which is a horizontal direction orthogonal to the Y axis direction.

10 Claims, 4 Drawing Sheets

(56) References Cited

U.S. PATENT DOCUMENTS

2014/0049122 A1    2/2014  Matsumoto

FOREIGN PATENT DOCUMENTS

| JP | S57-162541 | 10/1982 |
| JP | 2007-192679 | 8/2007 |
| JP | 2008-082720 | 4/2008 |
| WO | WO2009144989 | * 12/2009 |

OTHER PUBLICATIONS

Extended European Search Report issued for Application No. EP14869825 dated Dec. 21, 2017.
Partial Supplementary European Search Report issued in Application No. 14869825.1 dated Jul. 12, 2017.
First Examination Report issued in European Application No. 14 869 825.1 dated Jun. 22, 2018.

* cited by examiner

BEARING TESTING MACHINE

This is a Continuation-in-Part of International Application No. PCT/JP2014/082474 filed on Dec. 9, 2014, which claims priority from Japanese Patent Application No. 2013-257148 filed on Dec. 12, 2013. The entire disclosure of the prior applications is hereby incorporated by reference herein its entirety.

TECHNICAL FIELD

The present invention relates a bearing testing machine for testing durability of a bearing, and particularly to a bearing testing machine for testing an axle bearing which supports an axle of a trailer or a railroad vehicle bogie.

BACKGROUND

An axle of a railroad vehicle, a trailer or the like is supported by a vehicle frame via a plurality of axle bearings (e.g., a pair of axle bearings). Various types of loads, such as a radial load or an axial load, are applied to an axle bearing during traveling of a vehicle.

Japanese Patent Provisional Publication No. JP2008-82720A describes a bearing testing machine in which an axle for testing (hereafter, referred to as a "testing machine shaft") is attached to an axle bearing being a testing target, and the testing machine shaft is rotated while applying a radial load and an axial moment load to the axle bearing so that performance of the axle bearing used in an actual vehicle can be simulatively evaluated.

SUMMARY

During traveling of a vehicle, an axle and a vehicle frame make various types of motions, such as yawing (swinging of an axle around Z axis when an up and down direction is defined as Z axis direction), rolling (swinging of an axle around X axis when a front and rear direction of a vehicle is defined as X axis direction) and pitching (swinging around Y axis parallel with the axle). Therefore, a radial load, an axial load and a moment load (around Z axis and X axis) are dynamically applied to the axle bearing during traveling of a vehicle.

However, the testing machine described in JP2008-82720A is not able to perform testing while accurately simulating a normal traveling condition in which a dynamic load is applied to the axle bearing although the testing machine is able to perform testing while simulating a static traveling condition (not involving yawing, rolling and pitching).

The present invention is made in view of the above described circumstances, and the object of the invention is to provide a bearing testing machine capable of performing testing while accurately simulating a normal use condition, by applying vibrations to a testing machine shaft to which a test piece is attached while also applying motions, such as yawing and rolling, to the testing machine shaft.

According to an aspect of the invention, there is provided a bearing testing machine, comprising: a testing machine shaft to which at least one test piece being a bearing is attached, the testing machine shaft being a rotation shaft extending in a Y axis direction being a horizontal direction; a rotational driving unit configured to rotate the testing machine shaft; a test piece holding unit configured to elastically holds the at least one test piece; and at least one axle driving unit configured to drive the testing machine shaft in a vertical direction and in an X axis direction which is a horizontal direction orthogonal to the Y axis direction.

According to the above described configuration, it becomes possible to perform testing while accurately simulating a normal use condition in which various dynamic loads act on the axle bearing, by applying vibrations to the testing machine shaft to which the test piece is attached while also applying motions, such as yawing and rolling, to the testing machine shaft.

In at least one aspect, the at least one axle driving unit may comprise a bearing unit configured to rotatably support the testing machine shaft.

In at least one aspect, the bearing unit may comprise: a testing machine bearing that rotatably supports the testing machine shaft; and a hinge mechanism that supports the testing machine bearing to be swingable around an X axis.

In at least one aspect, the at least one axle driving unit may comprises: a driving table; a Z axis driving unit configured to drive the driving table in the vertical direction; an XY axis sliding mechanism that couples the driving table with the Z axis driving unit to be slidable in the X axis direction and the Y axis direction; an X axis driving unit configured to drive the driving table in the X axis direction; an YZ axis sliding mechanism that couples the driving table with the X axis driving unit to be slidable in the vertical direction and the Y axis direction; and an Z axis rotation mechanism that couples the driving table with the bearing unit to be swingable around a vertical axis.

In at least one aspect, the at least one axle driving unit may comprise: a Y axis driving unit configured to drive the driving table in the Y axis direction; and a ZX axis sliding mechanism that couples the driving table with the Y axis driving unit to be slidable in the vertical direction and the X axis direction.

In at least one aspect, the test piece holding unit may comprise: a shaft box that holds the at least one test piece; and an elastic member that applies a load acting in the vertical direction to the shaft box.

In at least one aspect, the at least one axle driving unit may comprise a pair of axle driving units.

In at least one aspect, the at least one test piece may comprise a first test piece and a second test piece which are attached to one end and the other end of the testing machine shaft, respectively. In this case, the shaft box may comprise: a first shaft box holding the first test piece; and a second shaft box holding the second test piece. The elastic member comprises: a first elastic member applying a load acting in the vertical direction to the first shaft box; and a second elastic member applying a load acting in the vertical direction to the second shaft box. The pair of the axle driving units may comprise: a first axle driving unit configured to drive the testing machine shaft on a first shaft box side; and a second axle driving unit configured to drive the testing machine shaft on a second shaft box side.

In at least one aspect, the bearing testing machine may further comprise a frame part that supports one end of the elastic member. In this case, the other end of the elastic member may be fixed to the shaft box.

In at least one aspect, the elastic member may be a coil spring.

DETAILED DESCRIPTION OF EMBODIMENTS

In the following, an embodiment of the invention is described with reference to the accompanying drawings.

Figure 1:
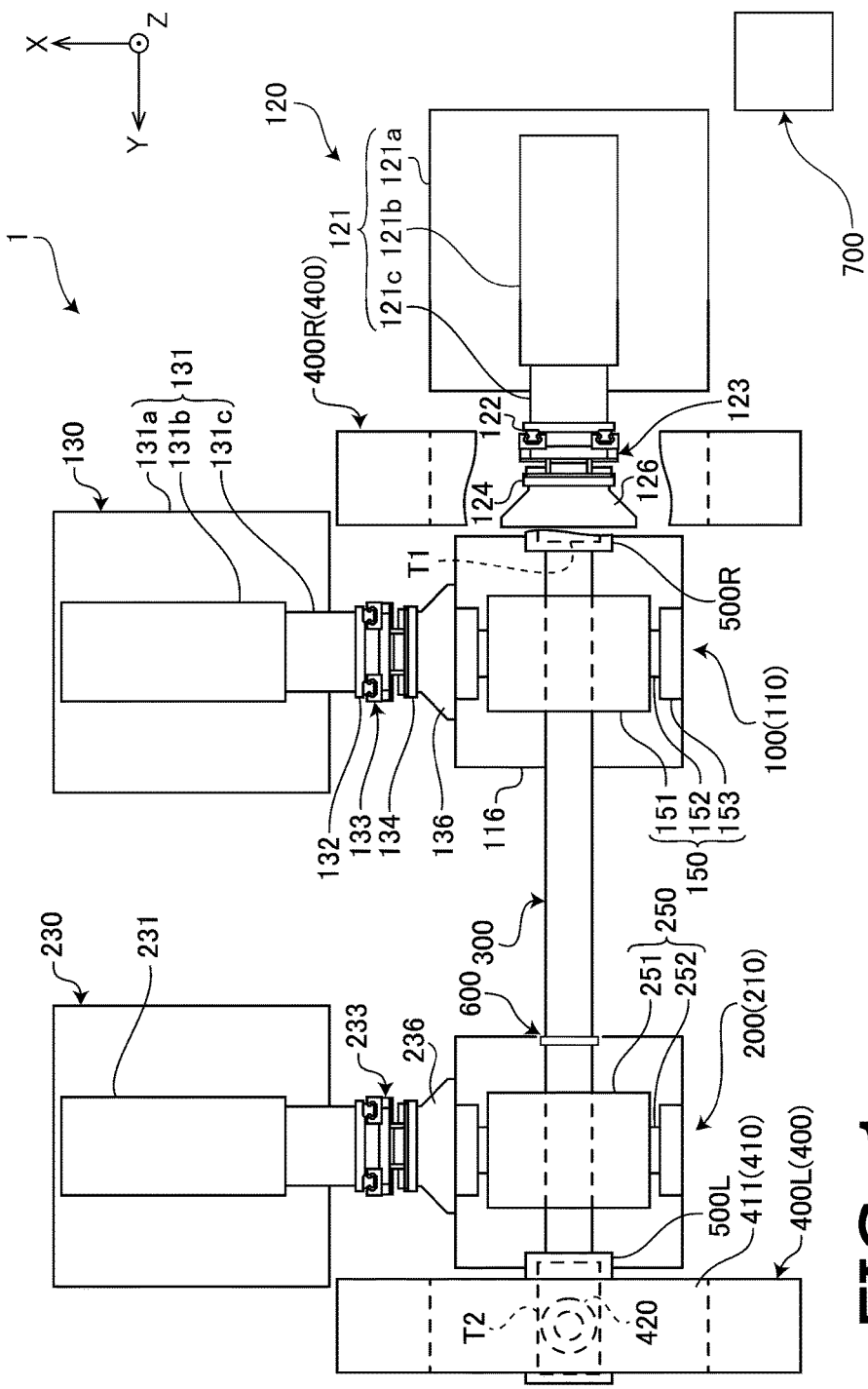
FIG. 1 is a plan view generally illustrating a bearing testing machine according to an embodiment of the invention.
Figure 2:
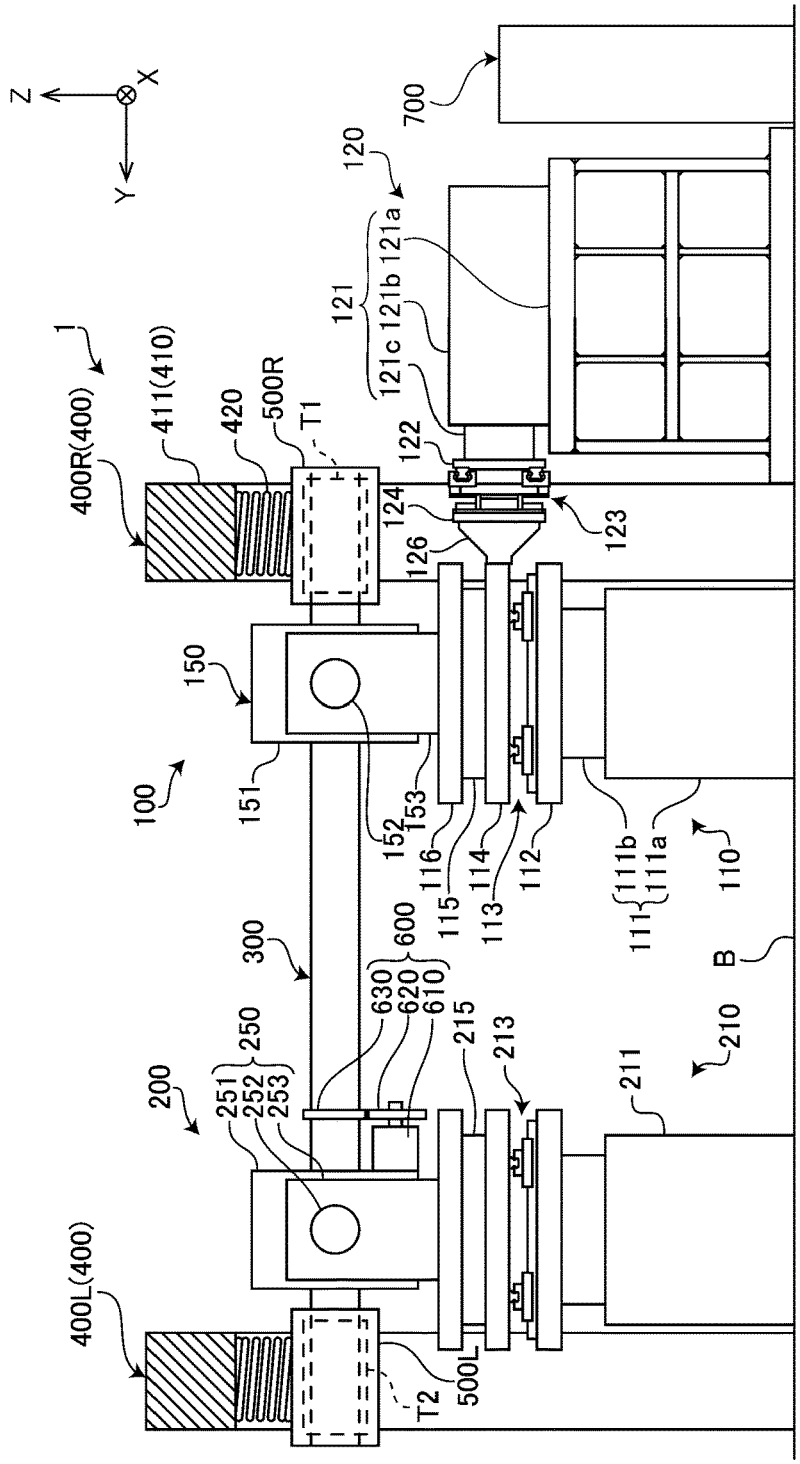
FIG. 2 is a front view generally illustrating the bearing testing machine according to the embodiment of the invention.

FIG. 1 is a plan view generally illustrating a bearing testing machine 1 according to the embodiment of the invention. FIG. 2 is a front view generally illustrating the bearing testing machine 1. In the following explanation, an up and down direction in FIG. 1 is defined as an X axis direction (an upper direction is a positive direction of X axis), a left and right direction in FIG. 1 is defined as a Y axis direction (a left direction is a positive direction of Y axis), and a direction perpendicular to the paper face of FIG. 1 is defined as a Z axis direction (a direction pointing from the back side to the front side of FIG. 1 is a positive direction of Z axis). X axis and Y axis are horizontal axes, and are perpendicularly intersecting with each other. Z axis is a vertical axis.

The bearing testing machine 1 according to the embodiment is a testing machine for evaluating durability of a bearing (an axle bearing) for rotatably supporting an axle of a trailer or a railroad vehicle bogie. In the testing by the bearing testing machine 1, as in the case of an actual use condition, a pair of test pieces T1 and T2 being axle bearings are attached to a testing machine shaft 300 of the bearing testing machine 1. Then, a moment load M (a dynamic load or a static load) is applied to the test pieces T1 and T2 (and the testing machine shaft 300), and the testing machine shaft 300 is further rotated while vibrating the test pieces T1 and T2 in at least one of the X axis direction, the Y axis direction and the Z axis direction. As a result, it becomes possible to accurately evaluate durability of the axle bearing in an actual use condition (i.e., a condition where the test pieces are actually attached to a traveling vehicle). Furthermore, it becomes possible to simultaneously test the two test pieces.

The bearing testing machine 1 includes a right axle driving unit 100, a left axle driving unit 200, the testing machine shaft 300, a pair of weight applying units 400 (400R, 400L), a right shaft box 500R, a left shaft box 500L, a rotational driving unit 600, and a control unit 700 (see FIG. 1) which controls operation of each unit in the bearing testing machine 1.

The testing machine shaft 300 is disposed to be parallel with Y axis, and is rotatably supported by the right axle driving unit 100 and the left axle driving unit 200. The test piece T1 is attached to a position near the right end (the end on the negative side of Y axis) of the testing machine shaft 300, and the test piece T2 is attached to a position near the left end (the end on the positive side of Y axis) of the testing machine shaft 300. The test pieces T1 and T2 are held and accommodated in the right shaft box 500R and the left shaft box 500L, respectively. The testing machine shaft 300 has substantially the same length and outer diameter as those of an axle of a vehicle in which the axle bearings are actually used, and the arrangement interval between the pair of test pieces T1 and T2 is set to be equal to the actual arrangement interval between the axle bearings when used. Furthermore, the arrangement interval between the right axle driving unit 100 and the left axle driving unit 200 (specifically, a testing machine bearing 151 and a testing machine bearing 252) is set to be equal to the interval between right and left wheels of a vehicle in which the axle bearings are used. By setting these arrangement intervals as described above, it becomes possible to accurately apply loads, which the axle bearings actually receive when a vehicle mounting the axle bearings travels, to the test pieces T1 and T2.

The right axle driving unit 100 and the left axle driving unit 200 are mechanical units which rotatably support the testing machine shaft 300, and drive the testing machine shaft 300 in three orthogonal directions (X axis, Y axis and Z axis directions). The right axle driving unit 100 includes a bearing unit 150 which rotatably supports the testing machine shaft 300, and an Z axis driving unit 110, a Y axis driving unit 120 and an X axis driving unit 130 which drive the testing machine shaft 300 in Z axis direction, Y axis direction and X axis direction, respectively, via the bearing unit 150.

As shown in FIG. 2, the Z axis driving unit 110 includes an Z axis actuator 111, three movable tables (a lower movable table 112, an intermediate movable table 114 and an upper movable table 116) arranged in the up and down direction, an XY axis sliding mechanism 113 and a Z axis rotation mechanism 115.

The Z axis actuator 111 is a hybrid type linear actuator having an electric actuator and a pneumatic actuator (an air spring or a pneumatic cylinder) connected in parallel (not shown). The Z axis actuator 111 is configured such that the pneumatic actuator bears a static load applied to the Z axis actuator and the electric actuator bears a dynamic load applied to the Z axis actuator. The pneumatic actuator hardly consumes energy when holding a constant load. Furthermore, the electric actuator has a high speed response (a high frequency response). Therefore, by bearing the static load and the dynamic load by the pneumatic actuator and the electric actuator, respectively, it becomes possible to drive a large amount of load at a high frequency in the vertical direction even when the energy consumption is small. The Z axis actuator 111 may be set such that the electric actuator bears a part of the static load.

Furthermore, in this embodiment, a linear actuator of a type in which a ball screw mechanism is driven by a servo motor (a rotation motor) is used as a built-in electric actuator provided in the Z axis actuator 111; however, it is also possible to use another type of electric actuator, such as an electrodynamic type actuator. A hydraulic pressure actuator may be used in place of the electric actuator.

The Z axis actuator 111 includes a fixed part 111a fixed to a base B, and a moving part 111b driven in the Z axis direction with respect to the fixed part 111a.

A lower surface of the lower movable table 112 is fixed to an upper end of the moving part 111b of the Z axis actuator 111, and the lower movable table 112 is movable integrally with the moving part 111b in the Z axis direction. The intermediate movable table 114 is connected to the upper surface of the lower movable table 112 to be slidable in the two horizontal directions (X axis direction and Y axis direction) via the XY axis sliding mechanism 113. Furthermore, a lower surface of the upper movable table 116 is connected to the upper surface of the intermediate movable table 114 via the Z axis rotation mechanism 115 to be rotatable (or swingable) about the Z axis. A lower surface of the bearing unit 150 is attached to the upper surface of the upper movable table 116. With this configuration, it is possible to drive the testing machine shaft 300 supported by the bearing unit 150 in the vertical direction while supporting the testing machine shaft 300 to be slidable in the X axis direction and the Y axis direction and to be rotatable about the Z axis (and about the X axis as described later).

The bearing unit 150 includes the testing machine bearing 151, two pairs of a hinge shaft 152 and a support wall 153. The two support walls 153 are disposed to face with each other in the X axis direction while sandwiching the testing machine shaft 152 therebetween, and the lower edges of the two support walls 153 are fixed to the upper surface of the upper movable table 116. Circular holes are formed respectively in the support walls 153 to penetrate through the support walls 153 such that the circular holes of the support walls 153 are coaxial with respect to each other. Furthermore, at portions on the testing machine bearing 151 facing the support walls 153, circular holes (not shown) penetrating therethrough in the X axis direction are formed to be coaxially with the circular holes of the support walls 153. One end of each of the hinge shafts 152 is inserted into the circular hole of the corresponding support wall 153, and the other end of each of the hinge shafts 152 is inserted into a hinge bearing attached to the testing machine bearing 151. As a result, the testing machine bearing 151 is supported to be rotatable (or swingable) about the X axis by a hinge mechanism (i.e., two pairs of the support walls 153, the hinge axes 152 and the hinge bearings).

Next to the Z axis driving unit 110 on the negative side of the Y axis, the Y axis driving unit 120 is disposed. The Y axis driving unit 120 includes a Y axis actuator 121, two movable tables 122 and 124, an ZX axis sliding mechanism 123 and a coupling member 126.

The Y axis actuator 121 includes a pedestal 121a fixed to the base B, a fixed part 121b placed on and fixed to the pedestal 121a, and a moving part 121c driven in the Y axis direction with respect to the fixed part 121b. As in the case of the Z axis actuator 111, the Y axis actuator 121 according to the embodiment is an electric actuator using a servo motor and a ball screw. Another type of electric actuator, such as an electrodynamic actuator, or a hydraulic actuator may be used as the Y-axis actuator 121. Since the Y axis actuator 121 need not bear a large amount of load, the Y axis actuator 121 is not provided with a pneumatic actuator.

The two movable tables 122 and 124 are disposed to face with each other to be parallel with the ZX plane between the Z axis driving unit 110 and the Y axis actuator 121. One surface of the movable table 122 on the Y axis actuator 121 side is fixed to the tip of the moving part 121c so that the movable table 122 is movable integrally with the moving part 121c in the Y axis direction. One surface of the movable table 124 is coupled to the other surface of the movable table 122 to be slidable in the orthogonal two directions (the Z axis direction and the X axis direction) via the ZX axis sliding mechanism 123. The coupling member 126 couples the other surface of the movable table 124 with the side surface of the intermediate movable table 114 of the Z axis driving unit 110. With this configuration, the intermediate movable table 114 of the Z axis driving unit 110 can be driven in the Y axis direction by the Y axis actuator 121 while letting the intermediate movable table 114 be slidable in the Z axis direction and the X axis direction with respect to the Y axis actuator 121.

As shown in FIG. 1, next to the Z axis driving unit 110 on the positive side of the X axis, the X axis driving unit 130 is disposed. The X axis driving unit 130 includes an X axis actuator 131, two movable tables 132 and 134, an YZ axis sliding mechanism 133 and a coupling member 136.

The X axis actuator 131 includes a pedestal 131a fixed to the base B, an fixed part 131b placed on and fixed to the pedestal 131a and a moving part 131c driven in the X axis direction with respect to the fixed part 131b. The X axis actuator 131 according to the embodiment is an electric actuator having the same configuration as that of the Y axis actuator 121.

The two movable tables 132 and 134 are disposed to face with each other to be parallel with the YZ plane between the Z axis driving unit 110 and the X axis actuator 131. One surface of the movable table 132 on the X axis actuator 131 side is fixed to the tip of the moving part 131c of the X axis actuator 131 such that the movable table 132 is movable integrally with the moving part 131c in the X axis direction. One surface of the movable table 134 is coupled to the other surface of the movable table 132 to be slidable in the orthogonal two directions (the Y axis direction and the Z axis direction) via the YZ axis sliding mechanism 133. The coupling member 136 couples the other surface of the movable table 134 with the side surface of the intermediate movable table 114 of the Z axis driving unit 110. With this configuration, the intermediate movable table 114 of the Z axis driving unit 110 can be driven in the X axis direction by the X axis actuator 131 while letting the intermediate movable table 114 be slidable in the Y axis direction and the Z axis direction with respect to the X axis actuator 131.

In the right axle driving unit 100, the Z axis driving unit 110 and the intermediate movable table 114 are coupled to each other via the XY axis sliding mechanism 113, the Y axis driving unit 120 and the intermediate movable table 114 are coupled to each other via the ZX axis sliding mechanism 123, and the X axis driving unit 130 and the intermediate movable table 114 are coupled to each other via the YZ axis sliding mechanism 133. With this configuration, it becomes possible to achieve driving in the orthogonal three axis directions by the Z axis driving unit 110, the Y axis driving unit 120 and the X axis driving unit 130 without causing interfering between the three orthogonal directions (i.e., so-called low crosstalk driving).

The left axle driving unit 200 has substantially the same configuration as that of the right axle driving unit 100; however, the left axle driving unit 200 is different from the right axle driving unit 100 in that the left axle driving unit 200 does not have a component corresponding to the Y axis driving unit 120. Specifically, the left axle driving unit 200 includes a Z axis driving unit 210 and an X axis driving unit 230. The Z axis driving unit 210 and the X axis driving unit 230 have the same configurations as those of the Z axis driving unit 110 and the X axis driving unit 130 of the right axle driving unit 100, respectively. More specifically, the Z axis driving unit 210 includes a Z axis actuator 211, an XY axis sliding mechanism 213, a Z axis rotating mechanism 215 and a bearing unit 250 which are coupled in the Z axis direction via three movable tables. The X axis driving unit 230 includes an X axis actuator 231, an YZ axis sliding mechanism 233 and a coupling member 236 which are coupled in the X axis direction via two movable tables.

The weight applying unit 400R is disposed to adjoin the Z axis driving unit 110 (the right axle driving unit 100) on the right side (the negative side of the Y axis) of the Z axis driving unit 110. Furthermore, the weight applying unit 400L is disposed to adjoin the Z axis driving unit 210 (the left axle driving unit 200) on the left side (the positive side of the Y axis) of the Z axis driving unit 210.

The weight applying unit 400R (400L) includes a frame part 410 formed in an arch shape (in a shape of an inverted-U) and a coil spring 420. An upper end of the coil spring 420 is fixed to the central part of the lower surface of a beam 411 of the frame part 410, and a lower end of the coil spring 420 is fixed to the upper surface of the right shaft box 500R (the left shaft box 500L).

The coil spring 420 is a compression spring and applies a static load pointing downward to one end of the testing machine shaft 300 via the right shaft box 500R (the left shaft box 500L) and the test piece T1 (T2). The static load simulates weight of a vehicle body applied to an axle mounted on an actual vehicle.

As shown in FIG. 2, the rotational driving unit 600 includes a motor 610 attached to a frame of a testing machine bearing 251, a drive gear wheel 620 driven by the motor 610, and a driven gear wheel 630 fixed to the testing machine shaft 300. The driven gear wheel 630 engages with the drive gear wheel 620, and a driving force of the motor 610 is transmitted to the testing machine shaft 300 via the drive gear wheel 620 and the driven gear wheel 630 to rotate the testing machine shaft 300.

Next, a durability test for the test pieces T1 and T2 performed by using the bearing testing machine 1 is explained. To the test pieces T1 and T2, the downward static load simulating the weight of a vehicle is being applied. The static load is transmitted, via the test pieces T1 and T2, to the testing machine shaft 300 simulating an axle of a vehicle. The static load applied to the testing machine shaft 300 is further transmitted to the right axle driving unit 100 and the left axle driving unit 200 supporting the testing machine shaft 300. The right axle driving unit 100 and the left axle driving unit 200 apply a reaction force of the static load and the vibrating force caused by the Z axis driving units 110 and 210 in the Z axis direction to the test pieces T1 and T2 via the testing machine shaft 300. Further, the right axle driving unit 100 applies the vibrating force caused by the Y axis driving unit 120 in the Y axis direction to the test pieces T1 and T2 via the testing machine shaft 300. Further, the right axle driving unit 100 and the left axle driving unit 200 apply the vibrating force caused by the X axis driving units 130 and 230 to the test pieces T1 and T2 via the testing machine shaft 300. It should be noted that the vibrating forces in the Z axis, Y axis and X axis directions simulate vibrations applied to an axle from a road surface via a wheel. A point at which the load from the test piece T1 (T2) is applied to the testing machine shaft 300 and a point at which the load from the right axle driving unit 100 (the left axle driving unit 300) is applied to the testing machine shaft 300 are different from each other. Therefore, as in the case of the load which an axle bearing mounted on a vehicle receives, the load applied to the test piece T1 (T2) via the testing machine shaft 300 includes a moment load about the X axis in addition to the load in the Z axis direction. Thus, the testing machine shaft 300 is rotated at a predetermined rotation number by the rotational driving unit 600 in a state where the sophisticated loads are applied to the test pieces T1 and T2 and the testing machine shaft 300. As a result, it becomes possible to perform the durability test under the load similar to actual use conditions by rotating the testing machine shaft 300 to which the test pieces T1 and T2 are attached while applying, to the test pieces T1 and T2, the load substantially equal to a load which an axle bearing attached to a vehicle receives during traveling of a vehicle.

The bearing testing machine 1 is further configured to be able to perform the durability test simulating a state where an axle is inclined with respect to a vehicle around the Z axis or the X axis.

Figure 3:
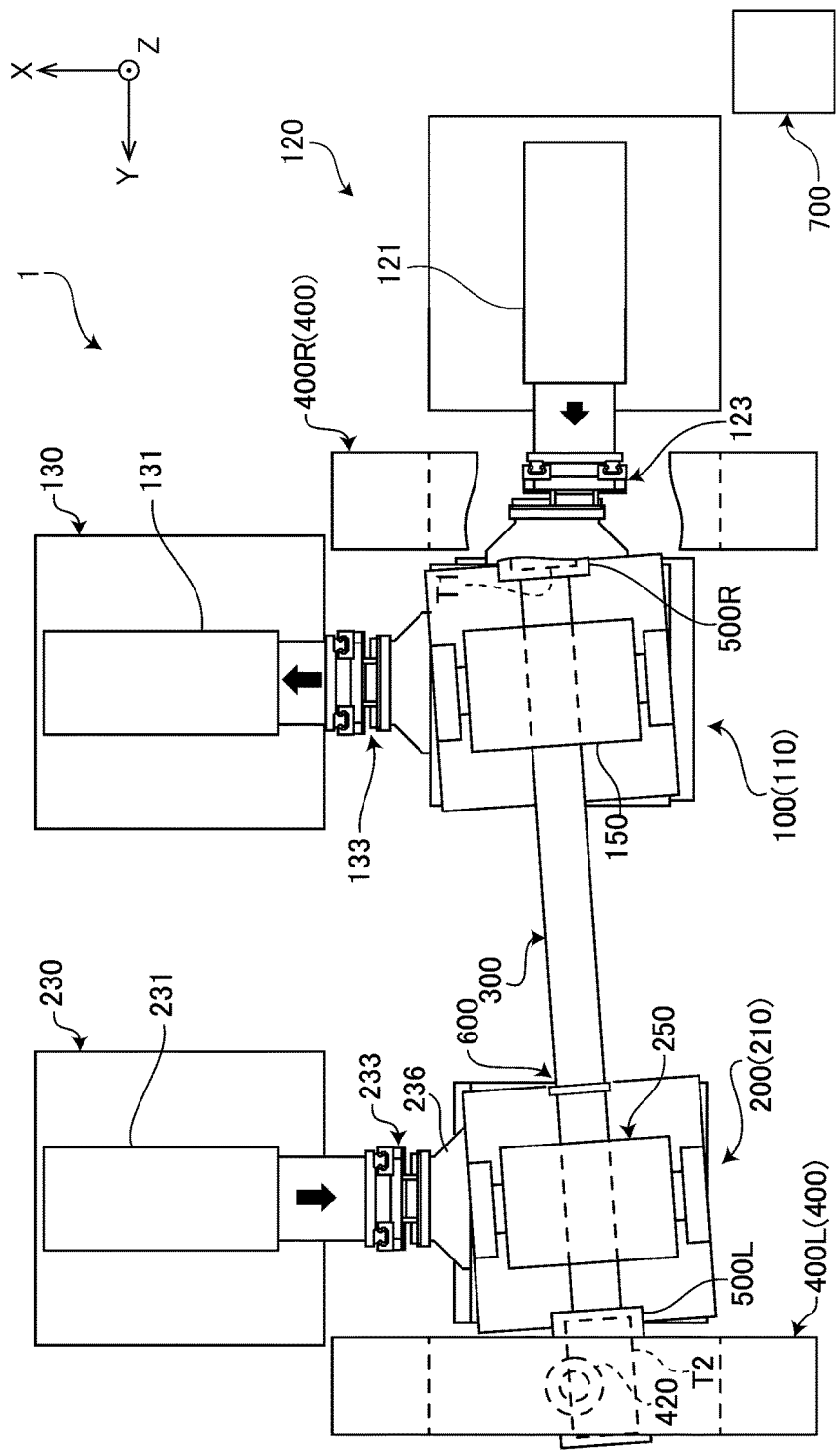
FIG. 3 is a plan view of the bearing testing machine, generally illustrating a case where the durability test is performed while simulating a state where an axle is inclined around Z axis with respect to a vehicle.

FIG. 3 is a plan view of the bearing testing machine 1, generally illustrating a case where the durability test is performed while simulating a state where an axle is inclined around the Z axis with respect to a vehicle. As described above, the bearing testing machine 1 is configured such that the testing machine shaft 300 and the bearing units 150 and 250 can be inclined around the Z axis by providing the Z axis rotation mechanisms 115 and 215 (see FIG. 2). Specifically, it is possible to cause the testing machine shaft 300 to be inclined around the Z axis without causing the bearing units 150 and 250 to be deformed, by moving the bearing units 150 and 250 by the X axis driving units 130 and 230 in the X axis direction by different distances. When the testing machine shaft 300 is inclined around the Z axis by driving the X axis driving units 130 and 230, it is necessary to shorten the arrangement interval between the bearing units 150 and 250 in the Y axis direction in accordance with the inclined angle. In this embodiment, the bearing unit 250 is set to be slidable in the Y axis direction with respect to the Z axis driving unit 210 and the X axis driving unit 230 by providing the XY axis sliding mechanism 213 and the YZ axis sliding mechanism 233. Therefore, when the testing machine shaft 300 is inclined around the Z axis, the bearing unit 250 slides on the Y axis, and the arrangement interval between the bearing units 150 and 250 in the Y axis direction can be automatically adjusted.

When the testing machine shaft 300 is inclined around the Z axis, shearing deformation is caused in the coil spring 420 in the X axis direction, and a shearing force acting in the X axis direction is applied to the test pieces T1 and T2 from the coil spring 420 as in the case of an axle bearing mounted on a vehicle. Therefore, the bearing testing machine 1 is able to apply, to the test pieces T1 and T2, a load substantially equal to a load which an axle bearing receives when an axle is rotated around the Z axis in an actual vehicle.

Figure 4:
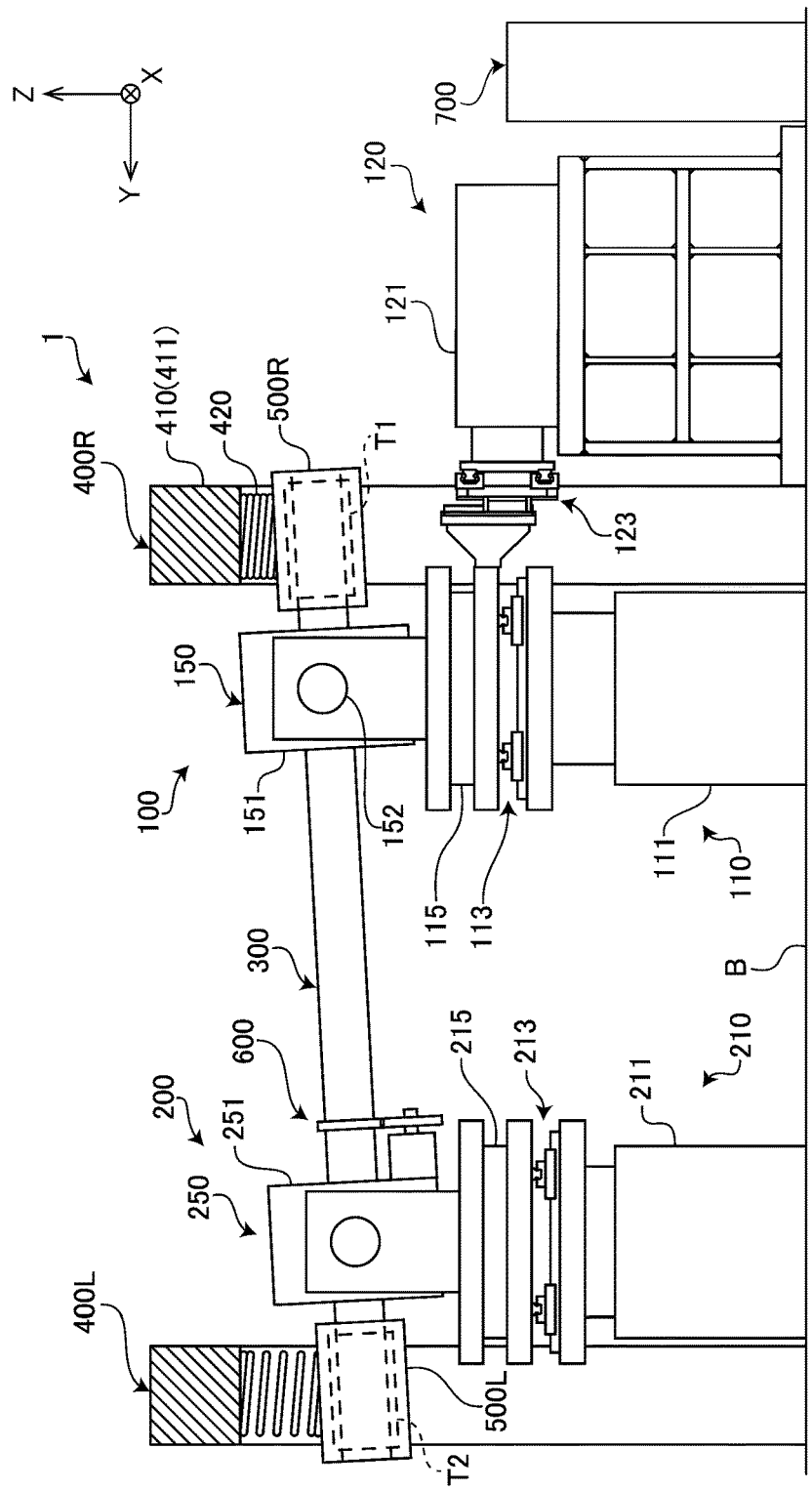
FIG. 4 is a plan view of the bearing testing machine, generally illustrating a case where the durability test is performed while simulating a state where an axle is inclined around X axis with respect to a vehicle.

FIG. 4 is a plan view of the bearing testing machine 1, generally illustrating a case where the durability test is performed while simulating a state where an axle is inclined around the X axis with respect to a vehicle. As described above, the testing machine bearing 151 (251) is configured to be swingable around the X axis by the hinge shaft 152 (252). Therefore, by moving the bearing units 150 and 250 in the Z axis direction by different distances by the Z axis driving units 110 and 210, it is possible to cause the testing machine shaft 300 to be inclined around the X axis without causing deformation in the bearing units 150 and 250. In this case, by the XY sliding mechanism 213 and the YZ sliding mechanism 233 (see FIG. 3), the bearing unit 250 slides in the Y axis direction and thereby the arrangement interval between the bearing units 150 and 250 in the Y axis direction is automatically adjusted so that an excessive tension is not caused on the testing machine shaft 300.

In this case, the coil spring 420 expands and contracts in the Z axis direction, and the magnitude of the static load being applied to the test pieces T1 and T2 in the Z axis direction from the coil spring 420 varies as in the case of an axle bearing mounted on a vehicle. Therefore, the bearing testing machine 1 is able to apply, to the test pieces T1 and T2, a load substantially equal to a load which an axle bearing receives when an axle is inclined around the X axis in an actual vehicle.

The above described embodiment is an example in which the present invention is applied to durability test for an axle bearing of a vehicle; however, the present invention is can be applied to durability test for various types of rotational bearings (a rolling bearing and a sliding bearing), in addition to an axle bearing.

The foregoing is the embodiment of the invention. However, the present invention is not limited to the above described embodiment, but can be varied in various ways within the scope of the invention.

For example, the frame part 410 may be provided with a static load adjustment means that adjusts the static load caused by the coil spring 420 so that the static load can be adjusted to a desired magnitude. As the static load adjustment means, a hydraulic cylinder for adjusting the magnitude of the static load, for example, by changing the height of the fixed position of the coil spring 420 may be used. In place of the coil spring 420, another type of elastic member, such as an air spring, may be used. In this case, by adjusting the air pressure supplied to the air spring, the static load can be adjusted. By thus providing the static load adjustment means, testing can be performed while assuming various types of vehicle bodies having different weights.

In the bearing testing machine 1 according to the embodiment, a pair of left and right X axis driving units 130 and 230 are provided. However, the bearing testing machine 1 may be configured to have only one of the left and right X driving units 130 and 230. In such a case, in the axle driving unit not having the X axis driving unit, an Y axis sliding mechanism and a Z axis sliding mechanism may be used in place of the XY axis sliding mechanism and the ZX axis sliding mechanism.

What is claimed is:

1. A bearing testing machine, comprising:
   a testing machine shaft to which at least one test piece being a bearing is attached, the testing machine shaft being a rotation shaft extending in a Y axis direction, the Y axis direction being a horizontal direction;
   a rotational driving unit configured to rotate the testing machine shaft;
   a test piece holding unit configured to elastically hold the at least one test piece; and
   at least one axle driving unit configured to slide the testing machine shaft in a Z axis direction and in an X axis direction, the Z axis direction being a vertical direction and the X axis direction being a horizontal direction orthogonal to the Y axis direction.

2. The bearing testing machine according to claim 1, wherein the at least one axle driving unit comprises a bearing unit configured to rotatably support the testing machine shaft.

3. The bearing testing machine according to claim 2, wherein the bearing unit comprises:
   a testing machine bearing that rotatably supports the testing machine shaft; and
   a hinge mechanism that supports the testing machine bearing to be swingable around an X axis.

4. The bearing testing machine according to claim 2, wherein the at least one axle driving unit comprises:
   a driving table;
   a Z axis driving unit configured to drive the driving table in the vertical direction;
   an XY axis sliding mechanism that couples the driving table with the Z axis driving unit to be slidable in the X axis direction and the Y axis direction;
   an X axis driving unit configured to drive the driving table in the X axis direction;
   an YZ axis sliding mechanism that couples the driving table with the X axis driving unit to be slidable in the vertical direction and the Y axis direction; and
   an Z axis rotation mechanism that couples the driving table with the bearing unit to be swingable around a vertical axis.

5. The bearing testing machine according to claim 4, wherein the at least one axle driving unit comprises:
   a Y axis driving unit configured to drive the driving table in the Y axis direction; and
   a ZX axis sliding mechanism that couples the driving table with the Y axis driving unit to be slidable in the vertical direction and the X axis direction.

6. The bearing testing machine according to claim 1, wherein the test piece holding unit comprises:
   a shaft box that holds the at least one test piece; and
   an elastic member that applies a load acting in the vertical direction to the shaft box.

7. The bearing testing machine according to claim 6, wherein the at least one axle driving unit comprises a pair of axle driving units.

8. The bearing testing machine according to claim 7, wherein the at least one test piece comprises a first test piece and a second test piece which are attached to one end and the other end of the testing machine shaft, respectively,
   wherein the shaft box comprises:
      a first shaft box holding the first test piece; and
      a second shaft box holding the second test piece,
   wherein the elastic member comprises:
      a first elastic member applying a load acting in the vertical direction to the first shaft box; and
      a second elastic member applying a load acting in the vertical direction to the second shaft box,
   wherein the pair of the axle driving units comprise:
      a first axle driving unit configured to drive the testing machine shaft on a first shaft box side; and
      a second axle driving unit configured to drive the testing machine shaft on a second shaft box side.

9. The bearing testing machine according to claim 6, further comprising a frame part that supports one end of the elastic member, wherein the other end of the elastic member is fixed to the shaft box.

10. The bearing testing machine according to claim 6, wherein the elastic member is a coil spring.

* * * * *